United States Patent [19]
Thomas, III

[11] 3,907,056
[45] Sept. 23, 1975

[54] ELECTRIC GOLF BAG CARRIER

[75] Inventor: Truman A. Thomas, III, Birmingham, Ala.

[73] Assignee: Electric Golf Carts, Inc., Birmingham, Ala.

[22] Filed: June 13, 1974

[21] Appl. No.: 479,171

[52] U.S. Cl............. 180/19 R; 280/DIG. 5; 403/97
[51] Int. Cl.² ........................................ B62D 51/04
[58] Field of Search................. 180/19 R, 19 H, 11; 280/DIG. 5, DIG. 6; 403/97

[56] References Cited
UNITED STATES PATENTS

| | | | |
|---|---|---|---|
| 1,800,349 | 4/1931 | Hurason............................ | 403/97 X |
| 2,687,895 | 8/1954 | Rutledge....................... | 280/DIG. 6 |
| 3,815,699 | 6/1974 | Ganskopp et al............. | 280/DIG. 5 |

FOREIGN PATENTS OR APPLICATIONS

| | | | |
|---|---|---|---|
| 469,296 | 11/1950 | Canada......................... | 280/DIG. 6 |

*Primary Examiner*—David Schonberg
*Assistant Examiner*—J. A. Pekar
*Attorney, Agent, or Firm*—Krass & Young

[57] ABSTRACT

An electrically powered cart for carrying golf bags employs a U-shaped yoke having bearings set in its two ends which journal an axle adjacent to its two ends. Two wheels are rotatably supported on the axle outboard of the yoke bearings and radially extending lugs on the ends of the axle engage pins on the wheel hubs to drive the wheels through the axle but allow the wheels to rotate freely of the axle through one rotation. The battery and drive motor are both supported on the yoke and the shaft of the drive motor powers a double ended gear reduction. The drive output shaft forms the center section of the axle. The golf bag is supported by straps on an elongated carrier formed of a pair of sections which are foldable relative to one another for storage purposes. One of the sections is pivotably supported at its center on a pin extending upwardly from the central section of the yoke so that the carrier may be compactly folded with the folded carrier sections extending alongside the central section of the yoke so that the carrier may be compactly folded with the folded carrier sections extending alongside the central section of the yoke.

8 Claims, 6 Drawing Figures

ELECTRIC GOLF BAG CARRIER

BACKGROUND OF THE INVENTION

1. Field of the Invention

This invention relates to a (battery-powered, motor-driven) cart for carrying golf bags or other bags or articles.

2. Prior Art

A variety of electrically powered golf bag carriers have been proposed as convenient compromises between the expensive and cumbersome golf carts which carry both the player and his golf bag and the inexpensive and compact manually powered bag carts which are tiring to operate, particularly on a golf course with hilly terrain. Because of their compromise nature, it is essential that such golf carts be relatively inexpensive, convenient to use and highly reliable in operation, lest the service problems created by the cart outweigh the advantages of using the cart. The carts should preferably be as light as possible so that they can be easily lifted into the trunk of an automobile.

For these reasons, the present invention is directed toward a motorized golf bag cart having a unique construction which is lightweight and relatively simple so as to be low in initial cost and reliable in operation and which allows the cart to be folded into an unusually compact configuration for storage and transportation purposes when not in use. The present invention may also be used for carrying other forms of containers, similar to golf bags.

SUMMARY OF THE INVENTION

The preferred embodiment of the golf cart employs a yoke formed of a section of tubular steel with its ends bent normally to the central section so as to assume a U-shape. Sleeve bearings are supported in holes formed at the ends of the yoke and journal the opposite ends of an axle. The cart's two wheels are rotatably supported on the axles and pins attached to each wheel hub engage lugs on the axle to allow the wheels to freely rotate through one revolution before being drivingly engaged to the axle. The unit can thus be turned without dragging one wheel, eliminating the need for a clutch or differential.

A battery and an electric drive motor are both supported on the yoke. The motor has a shaft extending normally to the axle and driving a double ended output drive having its output shaft forming part of the axle.

The golf bags are adapted to be supported on a carrier formed of a pair of sections of tubular rod joined to one another adjacent their ends by a pivotable connection so that the handle rod section may be disposed in either an operative position, as an extension of the main body carrier section, or a folded position wherein it lies parallel and along the main section. The main tubing section has a pair of bag retaining brackets formed along its length and is pivotably supported on a pin extending upwardly from a pivot bracket attached to the center section of the yoke. A nut, threaded on the pin, locks the carrier into its operative position wherein it extends perpendicularly to the center section of the yoke or into a storage position wherein it lies parallel to the yoke. In the storage position the handle section is also folded parallel to the main section of the carrier so that the unit assumes a very compact configuration.

The main tubing section is formed in two parts connected by the central pivot bracket and means are provided for rotating these sections about their central axes to displace the bag supporting brackets downwardly for storage purposes.

Other objectives, advantages, and applications of the present invention will be made apparent by the following detailed description of a preferred embodiment of the invention. The description makes reference to the accompanying drawings, in which.

Figures 1, 2, 3, 4, 5, 6:
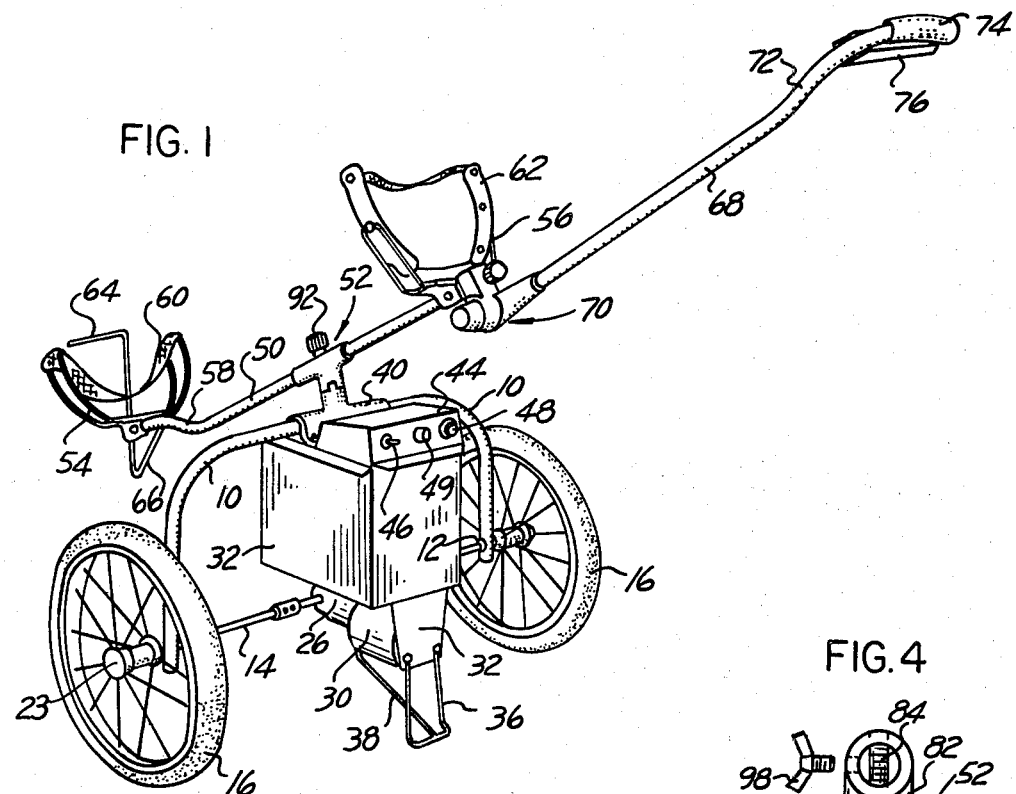
FIG. 1 is a perspective view of a motorized bag cart forming a preferred embodiment of the invention in an unfolded, operative position.
FIG. 2 is a plan view of the drive motor, gear box and axle.
FIG. 3 is a perspective view of the free-wheeling axle-wheel engagement mechanism.
FIG. 4 is a detailed view of the pivotable mount bracket for the bag carrier.
FIG. 5 is a perspective view of the cart of FIG. 1 in a folded storage position.
FIG. 6 is a sectional view through the pivotable mount bracket, taken along line 6—6 of FIG. 5.

Reffering to the drawings, the supporting structure for the powered bag carrier constituting the preferred embodiment of the invention primarily consists of a yoke 10 formed of a length of tubular steel having its end sections extending normally to its central section, in the same direction, and joined thereto by gentle bends, so as to assume a U-shaped configuration. A pair of holes are formed in the yoke 10 adjacent to its ends, parallel to the central section thereof and sleeve bearings 12 are press fitted into the holes. These bushings journal an axle 14 formed of hardened steel.

A rubber tired spoked wheel 16 is rotatably supported on each end of the axle 14, immediately externally of the yoke member 10. The wheels 16 are rotatably supported on the ends of the shaft 14 on bushings 18 (FIG. 3) incorporated in each wheel. The shaft extends slightly beyond the outside of each wheel and carries normally extending drive lugs 20 at each end. These pins act to abut pins 22 extending outwardly from the two wheel hubs, at a distance from their central axis, in order to impart a driving rotation of the shaft 14 to the wheels. This arrangement allows the wheel to rotate freely through almost one full revolution before the pin 20 hits the abutment 22 and drivingly engages the wheel to the axle. By this arrangement, one wheel 16 may "free wheel" while the cart is being turned, while either powered or at rest, eliminating the need for a clutch or differential gear arrangement. The drive lugs and wheel pins are covered by hub caps 23.

The axle shaft 14 comprises an integral extension of the double ended shaft 24 extending from a reducing gear drive 26. The two ends of the output shaft 24 are connected to the axle by a pair of sleeve type couplers 28. The input shaft of the gear reducer drive 26 extends normally to its output shaft 24 and the drive motor 30 and the gear reducer drive 26 are attached to and supported below a sheet metal battery box 32 which houses a wet cell battery powering the motor 30.

A sheet metal support plate 34 affixed to the bottom of the battery box 32 at the forward end of the motor protects and retains the forward end of the motor 30 and carries a U-shaped wire back tilt rest 36 which projects downwardly and provides the third point of support for the cart at rest. A wire brace 38 extends downwardly from the rear of the motor at an inclined angle and joins the rest 36 at the central point of its mid-section.

The battery box 32 is itself retained on the central section of the yoke 10 by a steel bracket 40 which surrounds the central section of the yoke and is fastened to the top of the battery box.

A control housing 44 is supported on top of the battery box forward of the bracket 40. The forward end of the panel supports a forward-reverse toggle switch 46, a speed control rheostat 48 and a replaceable fuse 45. A two piece bag support carrier bar 50 is supported above the center section of the yoke 10 by a pivotable bracket member generally indicated at 52. The bag support bar is formed of tubular steel and carries a pair of semicircular wire golf bag holding brackets 54 and 56. The bracket 54 is attached to the end of the bar 50 that extends toward the rear when the bar is extending perpendicularly to the center section of the yoke 10. The bar 50 is bent and rebent, as at 58, just before its end to slightly elevate the bracket 54. The brackets 54 and 56 support strap members 60 and 62 operative to circle a golf bag.

The extreme rear end of the bar 50, adjacent to the bracket 55, supports a triangular bracket 64 for supporting the bottom of the golf bag. A bent wire rest 66 is attached to the end of the bar 50 immediately below the bottom rest 64 and provides a third point of support for the cart when a bag is supported in the carrier, so as to overcome the weight of the battery which tends to pivot the unloaded cart so that it is supported on the rest 36.

A handle rod 68 formed of tubular steel is attached to the end of the bar 50 adjacent to the bracket 56 by a foldable joint assembly, generally indicated at 70. The joint assembly supports the rod 68 so that it forms an extension of the bar 50.

At its far end, the bar 68 is bent and rebent as at 72 to form a handle which is cased in a tubular plastic grip member 74. An electrical start-stop member 76 is supported below the grip member 74 so that the cart may be started and stopped by simply tightening or relaxing the grip on the member 74.

Appropriate electrical circuitry (not shown) connects the switch 76 to a battery stored within box 32 and to the electric drive motor 30. The direction of rotation of the motor is controlled by the position of the toggle switch 46 and the speed of the motor is controlled by the setting of the speed control 48. The operator may adjust the control to his comfortable pace and simply set and stop the drive with the switch 76.

The pivotable bracket member 52 is illustrated in detail in FIG. 4. It consists of a lower section 80 fixed to the upper side of the bracket 40 which retains the battery box 32 to the yoke 10 and an upper section 82 which retains and joins the two sections of the bag carrier bar 50. A threaded pin 84 has its lower end attached to the bracket 40 and extends upwardly through central holes in both the lower and upper bracket sections 80 and 82. A spring 86 extends between the lower and upper section 80 and 82 and biases them toward separation.

Mating surfaces of the upper and lower sections of the bracket 52 are formed with complementary lugs 88 and grooves 90 so that when the two sections are pressed together they are locked against rotation relative to one another. The two sections may be locked together in either the position shown in FIG. 1, wherein the carrier 50 extends normally to the central section of the yoke 10, or the folded position shown in FIG. 5 wherein the carrier 50 extends parallel to the central section of the yoke. A manually adjusted nut 92 screwed on the end of the threaded pin 84 may be tightened to force the two sections 80 and 82 together against the bias projected by a spring 86, or may be loosened to allow the sections to move apart so the carrier may be rotated between its folded and unfolded positions.

The two sections which form the carrier bar 50 are rotatable about their longitudinal axes within the upper bracket section 82. As is seen in FIG. 6, two ends of the carrier 50 have pins 94 projecting from their ends which are moveable in 180° slots 96 formed in the tubular sections of the upper bracket half 82. Wing head screws 98 may be tightened or loosened to allow rotation of the carrier sections 50 between their two positions. When the carrier is in its position the carrier sections 50 are rotated downwardly, as seen in FIG. 5, to allow the handle section 68 to extend over the carrier section 50.

The free wheeling arrangement allows the cart to be easily turned without dragging one wheel on the turn while the cart is either powered or at rest.

In alternative embodiments the speed control mechanism might be associated with an on-off switch on the handle so that the speed of the vehicle is controlled by the degree of closure of the proportional switch.

Having thus described my invention, I claim:

1. A powered carrier for bags comprising: an axle; a pair of wheels drivingly connected to the opposed ends of the axle; a generally U-shaped yoke member having its two ends journalling the shaft at spaced points, one adjacent to each wheel, so that the central section of the yoke extends parallel to and spaced from the axle; a power unit affixed to the yoke so as to be disposed between the yoke and the axle including a battery, an electric motor, and a gear reduction unit having an input shaft driven by the electric motor and a double-ended output shaft forming the center section of the axle; a rest member affixed to the power unit and providing, along with the wheels, a three-point ground support for the carrier; and an elongated bag support and handle member pivotably supported on the yoke member at the midpoint of its central section, on the side opposite to the axle, so as to be disposable in a first, operative position wherein it extends normally to the central section of the yoke and the axle, and a second, folded position wherein it extends parallel to the central section of the yoke and to the axle.

2. The bag carrier of claim 1 including means for locking said elongated support and handle member to said yoke in either its first position or its second position.

3. The bag carrier of claim 2 wherein the means for locking the support and handle member relative to the yoke includes a nut threadingly engaged with a threaded pin which has one end affixed to the yoke and which pivotably retains the support and the handle member on the yoke.

4. The bag carrier of claim 1 wherein the elongated support and handle member is pivotably supported on a pin having one end affixed to the yoke and extending therefrom in a direction opposite from and normally to the axle.

5. The bag carrier of claim 1 wherein the bag support and handle member consists of a pair of elongated sections joined end to end by a foldable connection so that the sections may be disposed in one position wherein they form linear extensions of one another or in a second position wherein they are in parallel overlapping disposition one to the other.

6. The powered carrier of claim 1 wherein the bag supporting handle member is pivotably supported on the yoke member by means of a pivotable support bracket, said bracket including a first section having a threaded pin projecting therefrom and a second section having a central aperture through which said pin passes, and a nut member threadedly engaged with said pin so as to force said first and second sections toward one another.

7. The bag carrier of claim 6 including spring means disposed between said first and second bracket sections and adapted to urge said bracket sections away from one another.

8. The bag carrier of claim 6 wherein the elongated bag supporting handle member is formed of a pair of sections joined together by said bracket section and said sections are rotatable within said upper bracket section.

* * * * *